United States Patent
Thirkettle et al.

(10) Patent No.: US 7,337,965 B2
(45) Date of Patent: Mar. 4, 2008

(54) BALL IDENTIFYING DEVICE

(75) Inventors: John S. Thirkettle, Long Marston (GB); David V. Jolliffe, Herts (GB)

(73) Assignee: World Golf Systems Limited, Watford, Herts (GB)

( * ) Notice: Subject to any disclaimer, the term of this patent is extended or adjusted under 35 U.S.C. 154(b) by 350 days.

(21) Appl. No.: 10/416,992

(22) PCT Filed: Nov. 19, 2001

(86) PCT No.: PCT/GB01/05097

§ 371 (c)(1),
(2), (4) Date: Sep. 16, 2003

(87) PCT Pub. No.: WO02/41240

PCT Pub. Date: May 23, 2002

(65) Prior Publication Data
US 2004/0048686 A1 Mar. 11, 2004

(30) Foreign Application Priority Data
Nov. 17, 2000 (GB) .................. 0028102.2
May 29, 2001 (GB) .................. 0112968.3

(51) Int. Cl.
*G06K 7/00* (2006.01)

(52) U.S. Cl. ............ 235/435; 235/385; 235/449; 473/131; 273/317.2

(58) Field of Classification Search ............... 235/435, 235/436, 385; 209/559; 473/131; 273/317.2, 273/108.2, 245; D21/319
See application file for complete search history.

(56) References Cited

U.S. PATENT DOCUMENTS

| 5,722,543 A | * | 3/1998 | Jarmuzewski | ............... 209/559 |
| 6,607,123 B1 | * | 8/2003 | Jollifee et al. | ............... 235/375 |
| 6,685,575 B1 | * | 2/2004 | Anderson | ............... 473/136 |

FOREIGN PATENT DOCUMENTS

| JP | 11137758 | | 5/1999 |
| JP | 2000229140 A | * | 8/2000 |
| WO | WO 96/17657 | | 6/1996 |
| WO | WO 99/48046 | | 9/1999 |

* cited by examiner

*Primary Examiner*—Seung Ho Lee
(74) *Attorney, Agent, or Firm*—Sheridan Ross, P.C.

(57) ABSTRACT

A device (80) for reading a coded golf ball (40) comprises a helical track (82) on the inside or outside of a cylindrical housing (81), the track serving to change the orientation of the ball relative to an antenna coil (85) to ensure that the code is read. The track may be arranged horizontally and rotated by a motor; a flap (30) may be provided to avoid balls following each other too closely onto the helical track. Alternatively the track may be arranged vertically and the balls may fall under gravity.

15 Claims, 5 Drawing Sheets

BALL IDENTIFYING DEVICE

BACKGROUND OF THE INVENTION

1. Field of the Invention

The present invention relates to the identification of spherical objects and in particular to the identification of coded golf balls in a golf game or a golf driving range as disclosed in WO 99/48046.

2. Description of the Related Art

A problem in detecting a spherical object (such as a golf ball) when it is stationary or moving in a straight line, is that the orientation of a transponder within the object may be such that it is not detected by a sensing antenna. Moreover, in automated golf driving ranges as disclosed in WO 99/48046, stopping a ball for code-reading purposes introduces unnecessary delay.

BRIEF SUMMARY OF THE INVENTION

Accordingly the present invention seeks to provide an arrangement for reading a coded object while it is moving.

When moving golf balls around an automated golf driving range, they can accumulate upstream of reading devices. This can cause jamming. In addition, certain code-reading technologies are incapable of discriminating between two balls if they are too close.

Accordingly the present invention also seeks to overcome or reduce this problem.

In accordance with a first aspect of the present invention, there is provided a device for recording the code of a coded spherical object as it is moving comprising a sensing member and a path for conveying objects through or past the member, the means defining the path including a helical track along which the objects are constrained to move.

As the objects move along the track they rotate about different axes in space, so that, whatever their initial orientation, their code can be read by the sensing member, i.e. there can be no blind spots undetected by the sensing member.

As the objects move along the track they rotate about different axes in space, so that, whatever their initial orientation, their code can be read by the sensing member, i.e. there can be no blind spots undetected by the sensing member.

The code is preferably stored in an r.f. identification tag contained within a golf ball. The balls may be as disclosed in PCT/GB00/02461. In this case the sensing member is an antenna, which may have coils passing around and/or along the helical track.

The helical track is preferably arranged on the inside surface of a hollow cylindrical or frusto-conical member.

The helical track may be part of a driven member operated by an electric motor. The driven member may extend horizontally, in which case the inlet of the helical track can be configured to admit only one ball at a time. Means, such as a leaf spring, can be provided to engage inserted balls such that a following ball cannot enter the track immediately after an initial ball, nor can the following ball cause jamming.

Alternatively the axis of the helical track may be arranged vertically in which case the balls can move under the effect of gravity. This arrangement is particular suitable for coding technologies which can operate even with touching balls. Of course, a ball separation device may be provided upstream of the helical track if required.

According to a second aspect of the present invention, there is provided a method of ensuring that the code of a coded spherical object can be read by a sensing member comprising moving the object along a helical track and at the same time through or past the sensing member.

The helical track produces the desired rotational movement of the spherical object.

BRIEF DESCRIPTION OF THE SEVERAL VIEWS OF THE DRAWING(S)

Preferred embodiments of the present invention will now be described, by way of example only, with reference to the accompanying drawings of which:

DETAILED DESCRIPTION OF THE INVENTION

Figure 1:
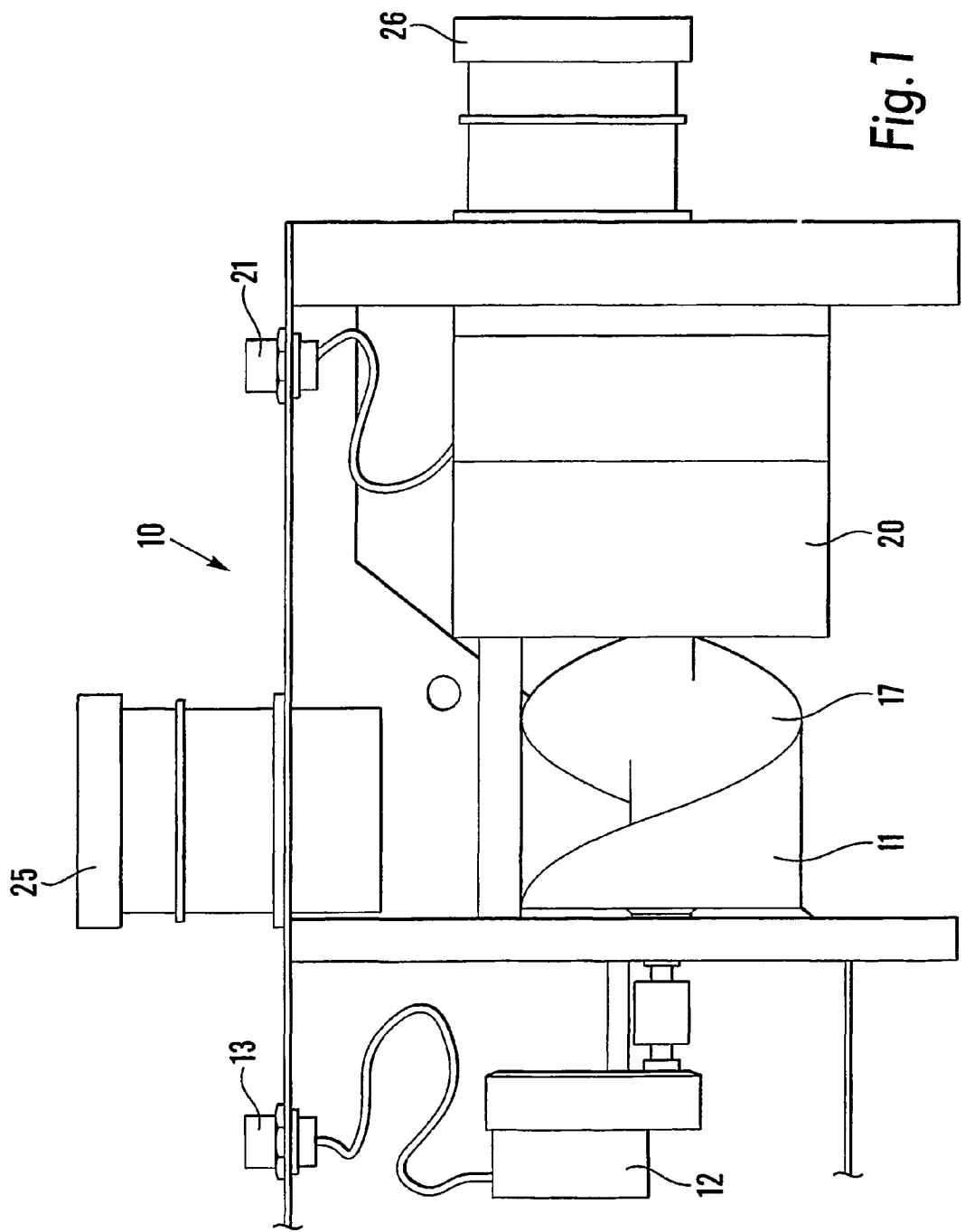
FIG. 1 shows a ball identifying device in accordance with a first embodiment of the present invention in which the balls are conveyed horizontally.

Referring to the drawings, FIG. 1 shows a ball identification device 10 comprising a helical screw 11 rotated about a horizontal axis by an electric motor and gear arrangement 12. An electrical connection for the motor is shown at 13. The helical screw is of a size suitable to receive a golf ball in its helical groove 17. The screw passes through a cylindrical housing 20 which incorporates the sensing antenna coils in its walls. A connector for the antenna is shown at 21.

In use, a golf ball (not shown in FIG. 1) having a coded r.f. identification tag, is introduced via an inlet 25 and enters groove 17. As the screw is rotated by the motor, the ball is constrained to move to the right of FIG. 1, past the antenna coils thus allowing the code of the tag to be read. Because the ball is constrained by the helical groove it is continually changing its instantaneous axis of rotation. This means that, even if in its initial orientation the ball's code cannot be read by the antenna, it is rotated into a new orientation in which it can be read before it leaves the region of the antenna. After being read, the ball then leaves via an outlet 26.

An advantage of the above arrangement is that is prevents balls passing the code reading antenna without having their code read. In addition there is no need to stop the ball to have its code read. Any debris entering the inlet 25 passes straight through the device without jamming or damaging it. An advantage of the horizontal arrangement in underground locations, is that it minimises the depth of excavation needed to accommodate it.

Various modifications may be made to the above-described embodiment. For example, the axis of the screw may be arranged vertically.

The antenna coils may extend cylindrically around the axis of the helical screw or they may extend longitudinally along only part of the circumference thereof.

Figure 2:
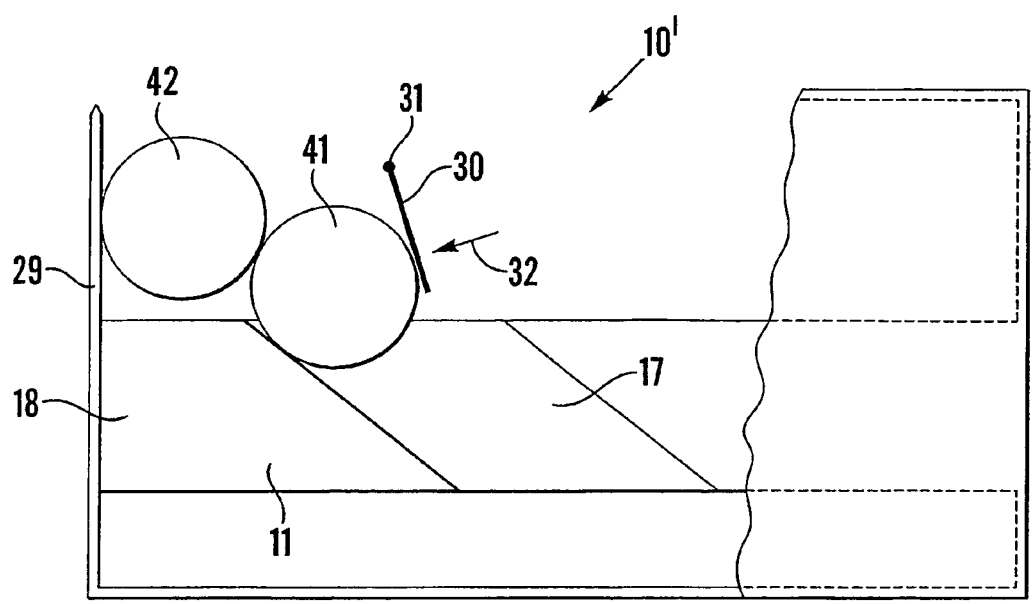
FIG. 2 shows a modification of the device of FIG. 1.

FIG. 2 shows a modified version $10^1$ of the embodiment of FIG. 1 incorporating a flap 30 which is biased by a spring (not shown) to pivot about a horizontal axis 31 in the direction of arrow 32. As a first golf ball 41 begins to enter groove 17 it is engaged by the flap 30 so as to be urged leftwards. If there is an immediately following ball 42, this is also urged leftwards against housing wall 29. The result is that, as the helical screw 11 rotates (the face visible in FIG. 2 moving upwardly), the ball 42 is constrained to travel on the raised part 18 of the screw, so that ball 42 cannot enter groove 17 until the screw has undertaken a whole rotation. This prevents ball 42 entering groove 17 simultaneously with, or immediately following, ball 41 which could cause jamming.

Another advantage of this arrangement is that it separates successive golf balls such as 41 and 42 in the conveying path. This is necessary for certain coding technologies, which are unable to reliably discriminate between immediately adjacent balls.

Figure 3:
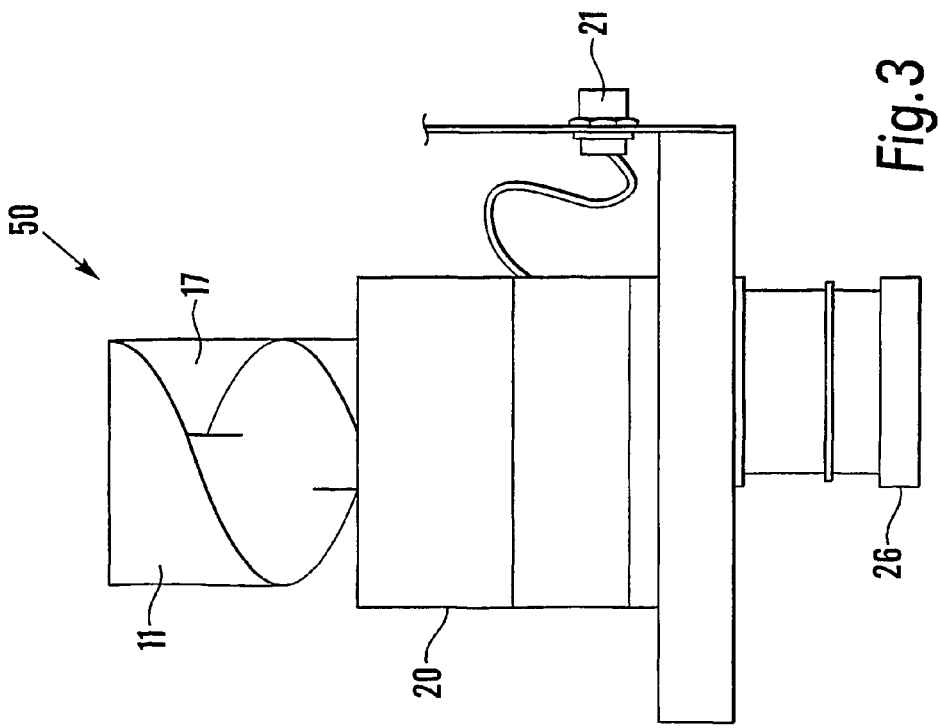

FIG. 3 shows a second embodiment of the present invention in which a ball identification device 50 has a helical screw 11 with a vertical axis, the balls travelling along groove 17 under the effect of gravity. The spacing between the screw 11 and the inner face of housing 20 is such that balls can travel to outlet 26 without jamming. This embodiment has the advantage of not requiring a power supply 13 since it has no moving parts.

Figure 4:
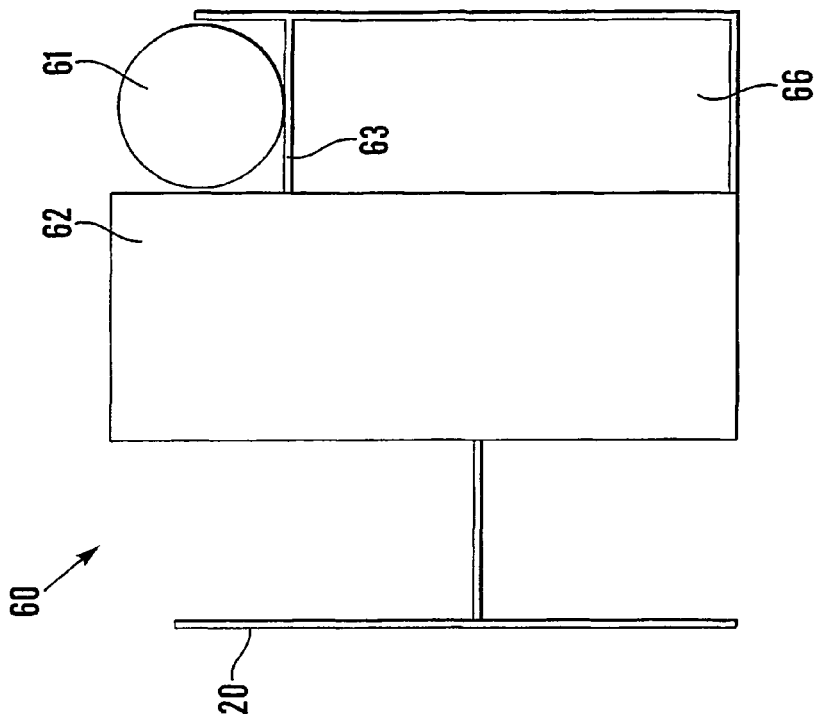
FIGS. 3 and 4 show second and third embodiments of the present invention, in which the balls move vertically.

FIG. 4 shows a third embodiment of the present invention in which a ball identification device 60 comprises a cylindrical core 62 with a helical track 63 located radially outwardly thereof in the manner of a helter-skelter. Again there are no moving parts, and a ball 61 travels freely along the track to outlet 66.

The antenna can be arranged inside core 62 if desired.

The second and third embodiments are suitable for coding technologies which can discriminate between immediately-adjacent golf balls. However, if desired a ball separating device may be provided upstream to maintain a desired minimum distance between successive balls.

Figure 6:
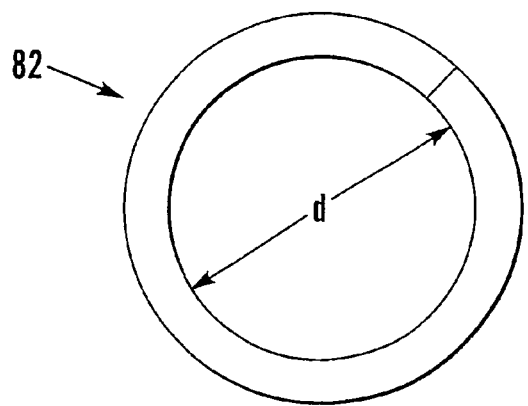
FIG. 6 is a top plan view of a track portion of the device of FIG. 5.
Figure 5:
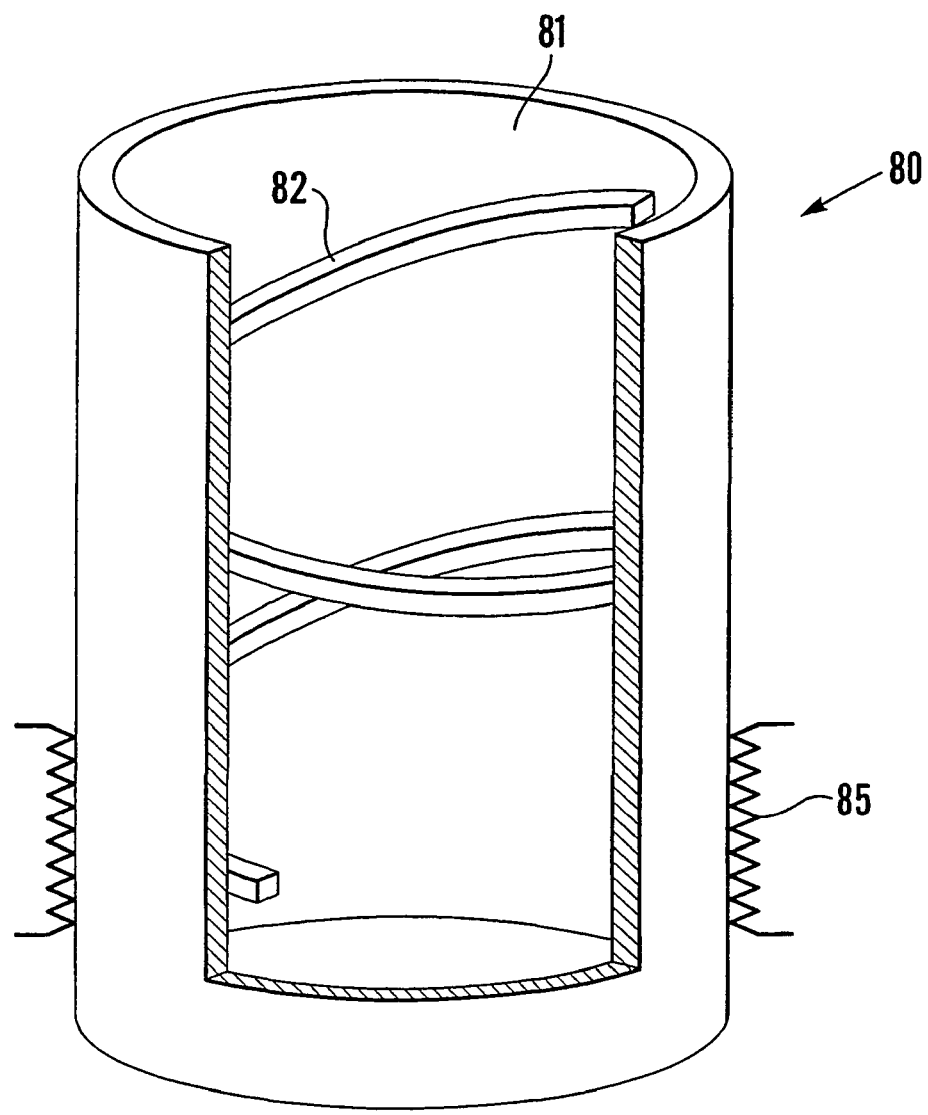
FIG. 5 is a perspective, partially cut-away, view of a ball identifying device in accordance with a fourth embodiment of the invention.

Referring now to FIGS. 5 and 6, a fourth embodiment of the ball identification device 80 comprises a generally cylindrical housing 81 with a helical track 82 located on its inner surface. The housing 81 may be constituted by a standard pipe fitting and its internal diameter is slightly larger than that of a golf ball. The internal diameter "d" of the track 82 as seen in FIG. 6 is 3 mm less than that of a golf ball. Accordingly a golf ball passing vertically through the housing 81 is constrained to rotate to follow the track 82. The pitch of track 82 is substantially 38 mm and it extends for substantially one and half turns. Track 82 may be formed integrally with housing 81, e.g. by moulding, or may be a separate component attached to housing 81.

Surrounding the exit of the housing 81 at the bottom is an antenna coil 85 for reading the code on a passing ball.

An advantage of the fourth embodiment is that it is generally compact and occupies less space than the third embodiment. In addition, the coded ball being read is enclosed within a housing and thus protected from external influences. An advantage of placing the detection coil at a spacing from the entrance to the housing is that, by the time the ball reaches the coil, it is undergoing a steady rotation with no tendency to slide.

In modifications, the housing 81 may be inclined to the vertical. It may also be oriented horizontally or near horizontally provided that there are means for assisting in moving the ball down the device, e.g. a blower for producing a moving air stream. The dimensions and materials may be changed as desired.

Figure 7:
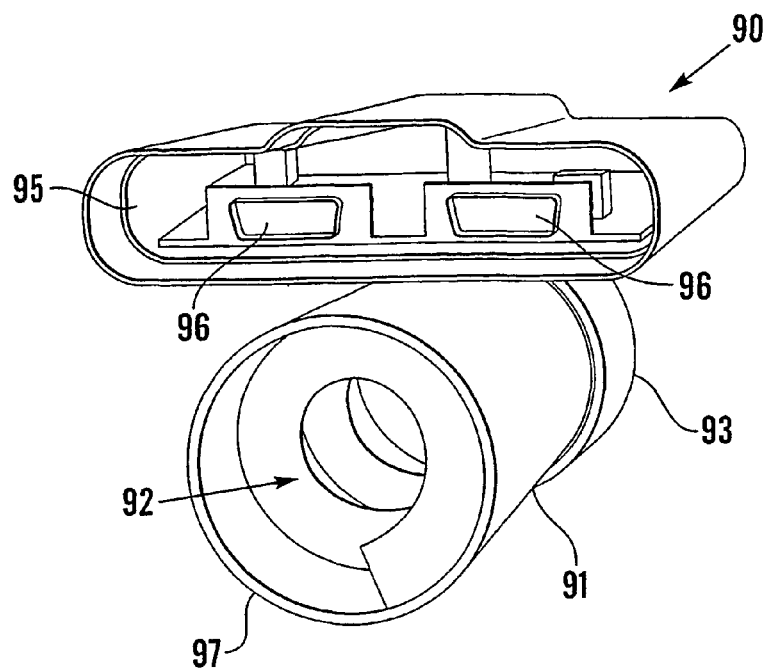
FIGS. 7 and 8 are perspective views of a fifth embodiment.
Figure 8:
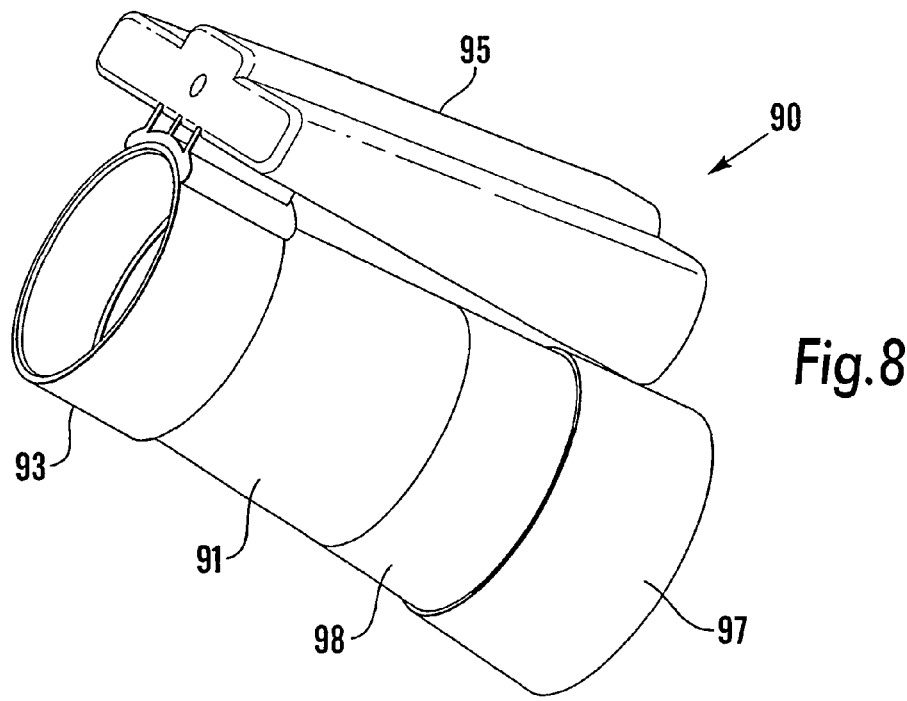

Referring now to FIGS. 7 and 8, a fifth embodiment of the ball identification device 90 comprises a tapering, i.e. frusto-conical, housing 91 with a helical track 92 incorporated in its inner surface. The housing is conveniently produced by a moulding operation. At its narrower, ball-receiving end the housing is provided with a locking ring 93 in the form of a bayonet fitting, which is arranged to be attached to a connector at the end of a conduit (not shown) for supplying a ball to the identification device. The conduit may be a pipe or a pocket of a target which is arranged to catch golf balls.

A housing 95 for circuitry associated with the ball identification device is attached to the locking ring 93 by means of a clip connection. Housing 95 has connectors 96 for enabling electrical connections to be made to printed circuit boards within housing 95. In use, the exit end 97 of the housing 91 is arranged below the ball-receiving end so that balls descend through the housing under the effects of gravity. The antenna coil 98 is arranged upstream of the exit end 97. Alternatively the antenna coil can be located within housing 95.

The features and modifications of the various embodiments described may be combined or interchanged as desired.

The above-described ball identification devices can be used with other types of code-reading. For example bar codes or other optical codes can be detected by an optical reader arranged inside the housing of the device. An external reader can be used when the housing is transparent. The articles identified may be any other objects which roll. The articles need not be coded in which case the reader simply detects their presence.

The invention claimed is:

1. A device for recording the code of a coded spherical object as the object is moving comprising a sensing member and a path for conveying objects through or past the sensing member, wherein the means defining the path includes a helical track along which and through the center of which the objects are constrained to move, so that the axis of rotation of the object is altered so that the code of the object can be read.

2. A device according to claim 1 wherein the code is stored in an r.f. identification tag contained within the object and wherein the sensing member is an antenna having coils positioned in a manner selected from the group consisting of passing around the helical track and passing along the helical track.

3. A device according to claim 1 wherein an inlet of the helical track is configured to admit only one object at a time.

4. A device according to claim 1, wherein the helical track has an axis arranged vertically.

5. A device according to claim 1, wherein the helical track is arranged inside of a housing member having a shape selected from the group consisting of cylindrical or frusto-conical.

6. A device according to claim 1, wherein the helical track is arranged inside of a housing member, the housing member having an entrance and an exit and wherein the sensing member surrounds the exit of the housing for reading a code on a passing object.

7. A device according to claim 1 wherein the helical track is arranged inside of a housing member, the housing member having an entrance and an exit and wherein the sensing member is located at a spacing from said entrance.

8. A device according to claim 1 in which the helical track is arranged inside of a housing member and wherein the housing is inclined to the vertical.

9. A device according to claim 1 in which the helical track is arranged inside of a housing member and wherein the housing is oriented horizontally or near horizontally and further comprising means for assisting in moving the object through the device.

10. A device according to claim 1 in which the helical track is arranged inside of a housing member and wherein the track is formed integrally with the housing.

11. A device according to claim 1 in which the helical track is arranged inside of a housing member and wherein the track is attached to the housing.

12. A method of ensuring that a code of a coded spherical object can be read by a sensing member comprising moving the object along a path, wherein the means defining the path include a helical track along which and through the center of which the objects are constrained to move so that the axis of rotation of the object is altered and at the same time moving the object through or past the sensing member.

13. A device for recording the code of a coded spherical object as the object is moving comprising a sensing member and a path for conveying objects through or past the sensing member, wherein the means defining the path includes a helical track along which the objects are constrained to move, wherein the helical track is part of a driven member operated by a motor, wherein said driven member extends horizontally and wherein a spring-biased member is provided to restrict a following object from entering the track.

14. A device for recording the code of a coded spherical object as the object is moving comprising a sensing member and a path for conveying objects through or past the sensing member, wherein the means defining the path includes a helical track along which the objects are constrained to move, wherein the helical track is arranged inside of a housing member, the housing member having an internal diameter substantially the same size as the diameter of an object conveyed by the path, to alter the axis of rotation of the object so that the code of the object can be read.

15. A device for recording the code of a coded spherical object as the object is moving comprising a sensing member and a path for conveying objects through or past the sensing member, wherein the means defining the path includes a helical track having an external and an internal diameter and wherein the external diameter of the helical track is larger than the object and the internal diameter of the helical track is less than that of the object, so that the objects are constrained to move along the helical track thus the orientation of the objects can be altered so that the code of the objects can be read.

* * * * *